Dec. 5, 1944.   W. G. CARTER   2,364,270
TURNOVER DEVICE
Filed Aug. 20, 1943

Inventor
William G. Carter
By Lyon & Lyon
Attorneys

Patented Dec. 5, 1944

2,364,270

UNITED STATES PATENT OFFICE 2,364,270

TURNOVER DEVICE

William G. Carter, Yakima, Wash., assignor to California Packing Corporation, San Francisco, Calif., a corporation of New York Application August 20, 1943, Serial No. 499,372

6 Claims. (Cl. 198—33)

This invention relates to turnover devices and more particularly to a device for use in a pear or fruit processing apparatus for insuring the delivery of fruit or pear halves onto a conveyer with their seed or core cavities turned upward.

It is an object of this invention to provide a device for turning fruit halves so that their core or seed cavities will be turned upwardly.

Another object of this invention is to provide an apparatus under which fruit halves, particularly pears, may be passed and which is operable to turn over pears received thereon which have their core or seed cavities turned down and which will permit the pear or other fruit halves which are received thereon with their core or seed cavities up to pass from the device in the position received.

Other objects and advantages of this invention it is believed will be apparent from the following detailed description of a preferred embodiment thereof as illustrated in the accompanying drawing.

Figure 1:
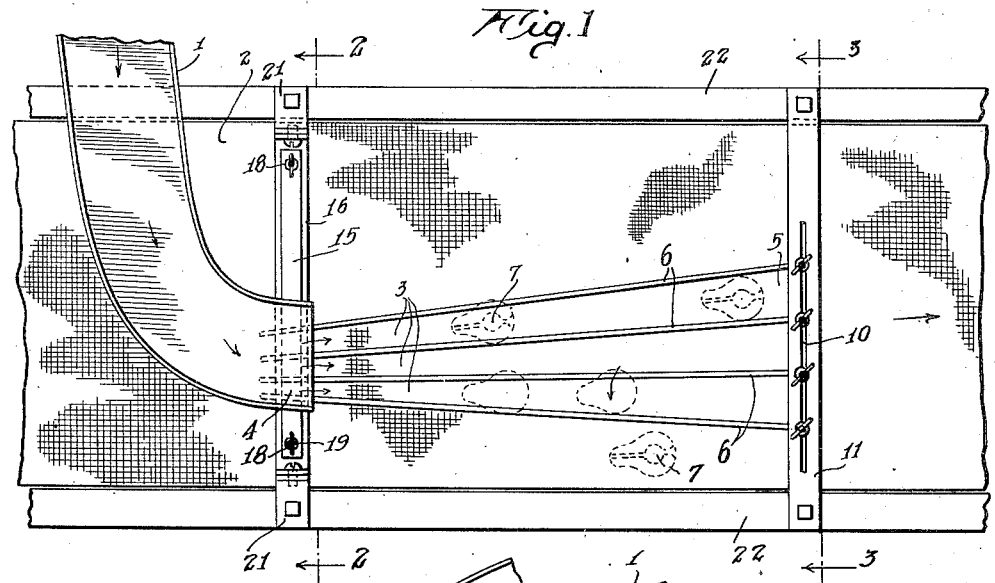
Figure 1 is a top plan view of the turnover device embodying my invention illustrating the same as interposed between a delivery chute and a sorting belt.
Figure 2:
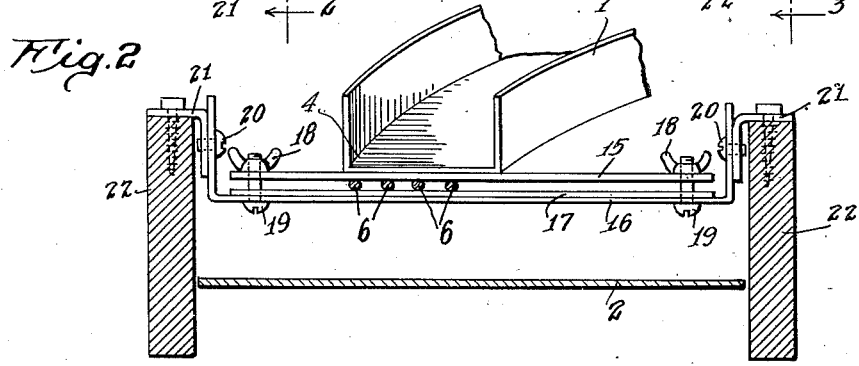
Figure 2 is a sectional end view taken substantially on the line 2—2 of Figure 1.

In the particular application of my invention illustrated I have shown the fruit turnover device embodying my invention particularly adapted for the turning over of pear halves as they are delivered to the device from an inclined chute 1 and which is operable to turn all of the fruit halves with their core or seed cavities up before the pears pass onto a sorting or conveyer belt 2 for delivery to subsequent operating devices of the pear preparation line.

The turnover device embodied in my invention is such as to provide a multiplicity of troughs 3 which are of inclined width from the receiving end 4 to the discharge end 5. These troughs in the modification illustrated are formed by spaced rods 6. Any other suitable structural means may be provided for forming the troughs.

I prefer to mount the rods or other means 6 in such manner that both the horizontal and vertical spacing of these rods may be adjusted with relation to the trough 1, conveyer 2, and the size of the fruit or pear halves which it is desired to invert.

The principle of my invention is that fruit halves being delivered into the troughs 3 are supported at their opposed edges by two such spaced rods 6. As the fruit halves slide along these rods, they will encounter a point where one edge of the fruit halves tends to pass between the rods, thus causing the pear half to be turned, that is, if the fruit half is resting between the rods with its plane or cut surface down against the rods so that its core or seed cavity 7 is turned down. If the fruit halves are turned with their core cavity 7 up so that the fruit is engaged upon its convex surface between the rods, the fruit will pass along the rods until it falls therebetween without being turned over or inverted.

In order to insure that the fruit lands on the belt 2 in correct position, the height of the rods 6 with reference to the conveyer 2 must be adjusted so that the fruit halves will turn through only one-half revolution before they come to rest upon the surface of the belt or conveyer 2. In order to insure this factor, the members or rods 6 forming the troughs 3 are adjustably mounted. Another essential of this invention which requires adjustment of the width of the troughs is determined by the differing sizes of fruit halves. Thus the rods 6 are adjusted to vary the width of the trough 3 from the receiving end 4 to the discharge end 5 thereof.

In order to accomplish these objects, each of the rods 6 is preferably formed as follows:

At the discharge end 5 the rods are bent upwardly to provide adjustment studs 8 at their discharge end. These studs 8 are threaded as indicated at 9 and are passed through a slot 10 formed in the supporting bar 11. A wing nut 12 is threaded to the stud portions 8 so as to determine the height of the rods 6 above the conveyer 2. In the adjusted position as determined by the threading of the wing nut 12 onto the threads 9, the rods 6 are locked in position by the use of a lock nut 13. As the studs 8 pass through the slot 10 their horizontal spacing at the discharge end may be determined prior to engagement of the lock nut 13 to hold the same in their adjusted position.

Figure 3:
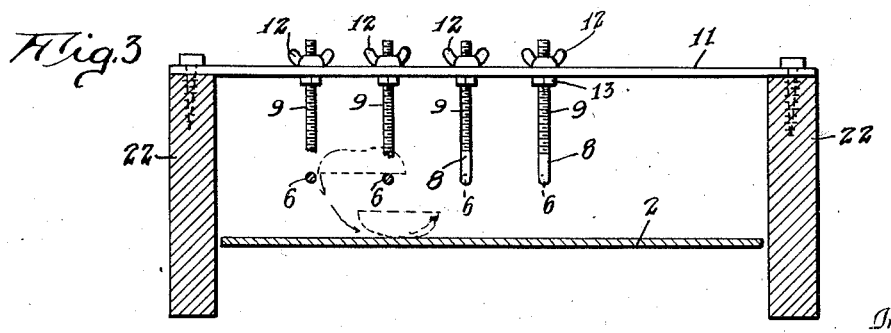
Figure 3 is a sectional end view taken substantially on the line 3—3 of Figure 1.

At the opposed ends the rods 6 are preferably straight rods and are supported in position below the discharge end 14 of the chute 1 by being clamped between clamp rods 15 and 16 to the face of one of which rods there is secured a flexible clamping material such as a strip of rubber 17. The two rods 15 and 16 are forced together to clamp the rods 6 through the medium of a pair of wing nuts 18 which are threaded to the clamp bolts 19. One of the clamp rods as, for example, the rod 16, is turned upwardly at its end and is secured by means of screws 20 to angle plates 21 secured to the side rails 22 of the conveyer 2. Supporting bar 11 is also secured to the side rails 22 as illustrated in Figure 3.

By supporting the members defining the troughs 3 in the hereinabove set forth manner, I am able to simply and easily adjust the width of the troughs 3 both at their receiving and discharge ends, and I am also able to adjust the height of the rods 6 from the conveyer 2 to be sure that the fruit halves will turn only through one-half revolution when they pass off from the rods 6 and onto the conveyer 2, thus insuring that all fruit halves which are received by the rods 6 with their plane face against the rods be turned through 180° so that its seed pod core or cavity 7 will be turned upwardly. The fruit halves which are correctly received, that is, with their seed pods or core cavities 7 turned upwardly will, due to the convex character of their portions in engagement with the rods, merely pass along the rods 6 until they fall between the rods without being inverted.

Having fully described my invention, it is to be understood that I do not wish to be limited to the details herein set forth, but my invention is of the full scope of the appended claims.

I claim:

1. In a turnover device of the character described, the combination of a plurality of members defining spaced open bottomed receiving troughs overlying a fruit-receiving member onto which fruit halves are to be delivered with their seed pods or core cavities turned upwardly, means for delivering the fruit halves to pass along the troughs, and the troughs being at their entrance end of a width less than the diameter of the fruit halves and of increasing width from their receiving to their discharge ends whereby fruit received over the troughs with their plane surfaces down will be inverted in passing through the open bottoms of the troughs.

2. In a fruit half turning device, the combination of a chute, a conveyer, a plurality of spaced apart and diverging rods defining open bottomed fruit troughs interposed between the chute and the conveyer, the rods being spaced apart at the entrance end of the troughs a distance less than the diameter of the fruit and overlying the conveyer, the spacing of said rods increasing from the chute in order to provide troughs of increasing width as the fruit pass thereover from the chute and are inverted as they fall through the open bottoms of the troughs from the position where their seed cavities are turned downwardly.

3. In a fruit half turning device, the combination of a fruit half delivering means, a fruit half receiving means, and a multiplicity of spaced rods defining open bottomed fruit troughs interposed between the fruit delivery and fruit receiving means and overlying the fruit-receiving means, said rods extending in the direction of travel of the fruit halves from the delivery to the receiving means, and being of progressively increasing spacing in the said direction of travel the rod spacing at the delivery ends of the troughs being less than the diameter of the fruit halves and increasing to a spacing greater than the diameter of any fruit half whereby the said halves fall through the open bottoms whereby the halves which have their cut surfaces down on the rods are inverted.

4. In a fruit half turning device, the combination of a fruit half delivering means, a fruit half receiving means, and a multiplicity of spaced rods defining open bottomed fruit troughs interposed between the fruit delivery and fruit receiving means, said rods extending in the direction of travel of the fruit halves from the delivery to the receiving means, and being of progressively increasing spacing in the said direction of travel, the rods being spaced apart at their fruit-receiving ends a distance less than the diameter of the fruit halves, and means for holding the rods in adjusted position.

5. In a fruit half turning device, the combination of a fruit half delivering means, a fruit half receiving means, and a multiplicity of spaced rods defining open bottomed fruit troughs interposed between the fruit delivery and fruit receiving means, said rods overlying the fruit-receiving means and extending in the direction of travel of the fruit halves from the delivery to the receiving means and being of progressively increasing spacing in the said direction of travel, the rods being spaced at the fruit-receiving ends of the troughs a distance less than the diameter of the fruit halves, and means for adjusting the height of one end of said rods over said receiving means.

6. In a fruit half turning device, the combination of a fruit half delivering means, a fruit half receiving means, and a multiplicity of spaced rods defining open bottomed fruit troughs interposed between the fruit delivery and fruit receiving means, said rods extending in the direction of travel of the fruit halves from the delivery to the receiving means and being of progressively increasing spacing in the said direction of travel, means for adjustably holding the spacing of said rods, and means for adjusting the height of one end of said rods over said receiving means, the rods being spaced apart at the receiving ends of the troughs a distance less than the diameter of the fruit halves, and whereby the fruit in traveling along the troughs and reaching a position of trough width greater than their diameter will fall through the open bottoms of the trough and the fruit being supported by said rods upon their flat cut surfaces will be inverted on reaching the fruit-receiving means.

WILLIAM G. CARTER.